United States Patent
Ben-David et al.

(10) Patent No.: US 10,751,875 B2
(45) Date of Patent: Aug. 25, 2020

(54) ROTATABLE MOBILE ROBOT FOR MAPPING AN AREA AND A METHOD FOR MAPPING THE SAME

(71) Applicant: Indoor Robotics Ltd., Ramat-Gan (IL)

(72) Inventors: Doron Ben-David, Ramat-Gan (IL); Amit Moran, Tel-Aviv (IL)

(73) Assignee: INDOOR ROBOTICS LTD, Ramat-Gan (IL)

( * ) Notice: Subject to any disclaimer, the term of this patent is extended or adjusted under 35 U.S.C. 154(b) by 141 days.

(21) Appl. No.: 15/993,624

(22) Filed: May 31, 2018

(65) Prior Publication Data
US 2019/0366542 A1   Dec. 5, 2019

(51) Int. Cl.
| | |
|---|---|
| G05B 15/00 | (2006.01) |
| G05B 19/00 | (2006.01) |
| B25J 9/16 | (2006.01) |
| G05D 1/02 | (2020.01) |

(52) U.S. Cl.
CPC ......... B25J 9/1664 (2013.01); B25J 9/1697 (2013.01); G05D 1/0219 (2013.01); *Y10S 901/01* (2013.01); *Y10S 901/09* (2013.01); *Y10S 901/47* (2013.01)

(58) Field of Classification Search
CPC ..... B25J 9/1664; B25J 9/1697; G05D 1/0219; Y10S 901/01; Y10S 901/09; Y10S 901/47
See application file for complete search history.

(56) References Cited

U.S. PATENT DOCUMENTS

| | | | | |
|---|---|---|---|---|
| 2012/0087222 | A1* | 4/2012 | Kobayashi | G11B 7/00458 369/53.12 |
| 2012/0187868 | A1* | 7/2012 | Winter | G01C 15/004 315/307 |
| 2016/0315703 | A1* | 10/2016 | Dumoulin | H04B 10/1143 |
| 2018/0113200 | A1* | 4/2018 | Steinberg | G08G 1/04 |
| 2018/0188359 | A1* | 7/2018 | Droz | G01S 17/42 |
| 2018/0206688 | A1* | 7/2018 | Chao | A47L 9/28 |
| 2018/0284234 | A1* | 10/2018 | Curatu | G01S 7/4817 |
| 2019/0183310 | A1* | 6/2019 | Herron | A47L 9/2852 |

* cited by examiner

*Primary Examiner* — Harry Y Oh
(74) *Attorney, Agent, or Firm* — Soroker Agmon Nordman (57) ABSTRACT

The subject matter discloses a mobile robot configured to map an area, comprising a body, two or more distance sensors, configured to collect distance measurements between the mobile robot and objects in the area, a rotating mechanism mechanically coupled to the body and to the two or more distance sensors, said rotating mechanism is configured to enable rotational movement of the two or more distance sensors and a processing module electrically coupled to the two or more distance sensors and to the rotating mechanism. The processing module is configured to process the distance measurements collected by the two or more distance sensors and to instruct the rotating mechanism to adjust a velocity of the rotational movement, said velocity is adjusted according to the distance measurements collected by the two or more distance sensors.

15 Claims, 5 Drawing Sheets

ROTATABLE MOBILE ROBOT FOR MAPPING AN AREA AND A METHOD FOR MAPPING THE SAME

FIELD OF THE INVENTION

The present invention relates to mobile robots and more specifically to mobile robots having sensors for mapping an area.

BACKGROUND OF THE INVENTION

One of the tasks performed by mobile robots includes mapping areas, such as houses, rooms, fields, either indoor or outdoor. When the area is indoor, mapping may be performed by emitting a signal to a general direction of a wall defining the indoor mapped area, and determining the distance from the wall in the specific direction according to the time elapsed between emitting the signal and detecting the signal's reflection from the wall.

One method of mapping an indoor area discloses the use of laser beams outputted from a laser unit located on the mobile robot. The laser beam is emitted from a laser module mounted in the mobile robot. The laser module rotates 360 degrees around the lateral side of the mobile robot, emitting laser at a predefined sampling frequency, for example 4000 beams a second, with a resolution of 1 beam per degree, amounting to about 11 rounds per second.

Laser modules, such as LIDAR (Laser Imaging, Detection and Ranging) are relatively expensive and difficult to maintain, as replacing laser modules require technical expert, relative to replacing an off-the-shelf camera.

SUMMARY OF THE INVENTION

It is an object of the claimed invention to disclose a mobile robot configured to map an area, comprising a body, two or more distance sensors, configured to collect distance measurements between the mobile robot and objects in the area, a rotating mechanism mechanically coupled to the body and to the two or more distance sensors, said rotating mechanism is configured to enable rotational movement of the two or more distance sensors, a processing module electrically coupled to the two or more distance sensors and to the rotating mechanism, said processing module is configured to process the distance measurements collected by the two or more distance sensors and to instruct the rotating mechanism to adjust a velocity of the rotational movement, said velocity is adjusted according to the distance measurements collected by the two or more distance sensors.

In some cases, the two or more distance sensors are four distance sensors arranged such that each sensor points at substantially 90 degrees from the other sensors. In some cases, the two or more distance sensors comprise a light emitting member configured to emit light towards the area and a photovoltaic cell configured to measures a duration the light travelled from the light emitting member to the object and back to a focal plane array of the photovoltaic cell.

In some cases, the mobile robot further comprises an inertial measurement unit (IMU) configured to measure the body's specific force and angular rate. In some cases, the mobile robot further comprises a camera configured to capture images of the area, wherein the processing module is electrically coupled to the camera, said processing module receives the captured images from the camera to estimate distance covered by the mobile robot while mapping the area, to assign a location to the distance measurements collected by the two or more distance sensors.

In some cases, the mobile robot further comprises a memory module configured to store one or more rules concerning adjusting the velocity of the rotational movement, wherein the processing module is electrically coupled to the memory module for adjusting the velocity according to the one or more rules.

In some cases, the one or more rules comprise reducing the velocity when the collected measurements show distance higher than a predefined threshold. In some cases, the mobile robot further comprises a sensor housing configured to house the two or more distance sensors, wherein the sensor housing is secured to the body in a manner than enables rotating the sensor housing and the two or more distance sensors.

In some cases, the two or more distance sensors are evenly distributed. In some cases, the rotational movement is limited to a predefined angle defined by the number of the two or more distance sensors. In some cases, the rotating mechanism is configured to move the two or more distance sensors in a rotational movement relative to the body of the mobile robot. In some cases, the rotating mechanism is configured to move the two or more distance sensors in a rotational movement applied synchronously to the body of the mobile robot.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The subject matter in the present invention discloses a mobile robot configured to map an area using two or more distance sensors positioned on the mobile robot. The distance sensors emit signals, for example light signals, and measure the distance from the object according to the time elapsing between emission and reflection. The two or more distance sensors rotate in an adjusted velocity, according to commands of a processing module of the mobile robot. The velocity of rotational movement depends on prior distance measurements collected by the two or more distance sensors. As opposed to mobile robots that use laser signals which rotate in a high velocity in a single direction (clockwise or counter clockwise), the distance sensors used by the mobile robot rotate slower and in a controlled manner. The controlled manner enables to adjust the resolution of distance measurements according to the physical location of the mobile robot. For example, in case the distance from other objects is higher than a predefined threshold, there is a need to increase the resolution, and the processing module of the mobile robot instructs a rotational mechanism to decrease the rotational velocity, thus enabling to sample more distances at generally the same direction, as elaborated below.

Figure 1:
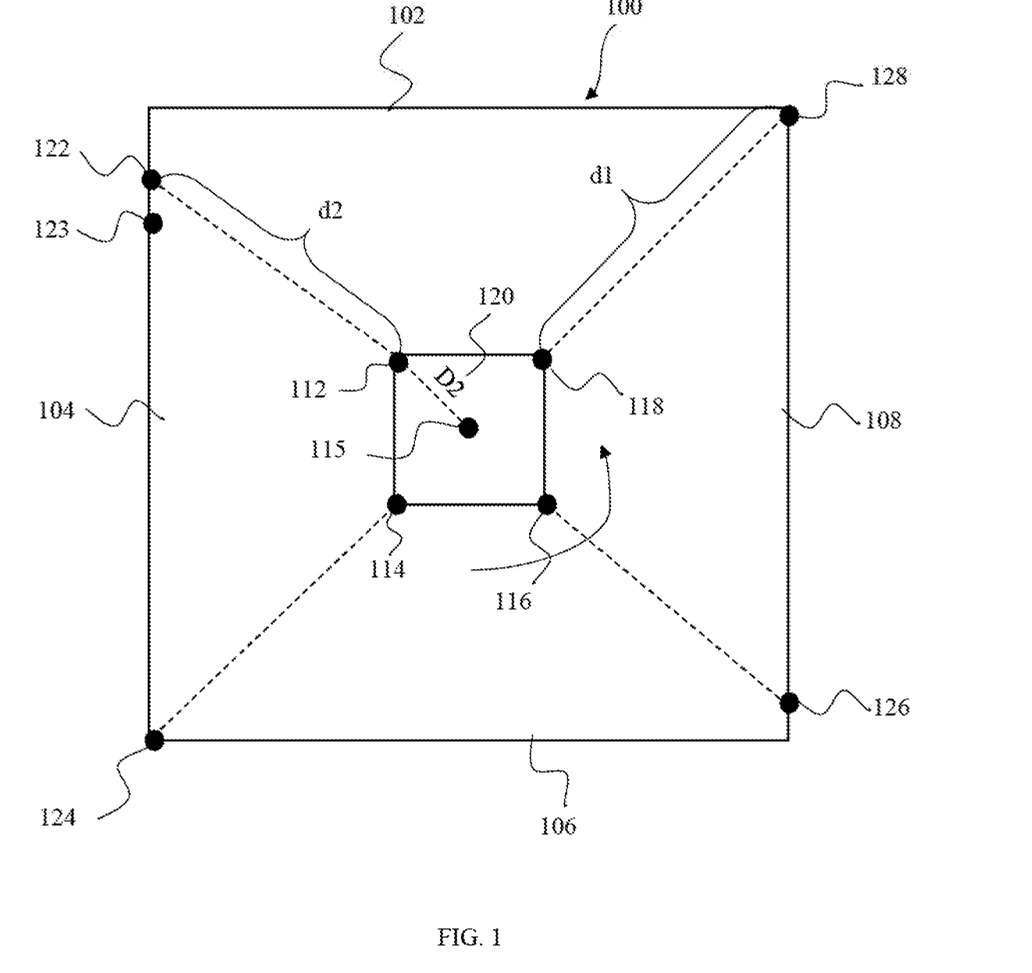
FIG. 1 disclose a mobile robot mapping an area, according to exemplary embodiments of the subject matter.

FIG. 1 disclose a mobile robot mapping an area, according to exemplary embodiments of the subject matter. The area 100 is defined by walls 102, 104, 106 and 108. The area 100 may be a room, a field, a house, a greenhouse, either covered by a ceiling or roof, or exposed to the sunlight. The area 100 may include objects such as furniture, plants, animals, machines and the like. The mobile robot 120 moves in the predefined area 100 in order to map the predefined area 100, as the mapping includes at least a portion of the walls 102, 104, 106 and 108 and objects (not shown).

The mobile robot 120 comprises multiple distance sensors 112, 114, 116 and 118, configured to measure the distance between the mobile robot 120 to the walls or objects in the area 100. The multiple distance sensors 112, 114, 116 and 118 may be a range camera, for example a time-of-flight camera (ToF camera) configured to resolve distance based on the known speed of light, measuring the time-of-flight of a light signal between the camera and the subject for each point of the image. The distance measurements collected by the multiple distance sensors 112, 114, 116 and 118 may be stored by a memory module of the mobile robot 120, or sent to a remote device for further processing and/or storage via a communication module of the mobile robot 120, as elaborated below. The multiple distance sensors 112, 114, 116 and 118 may include two distance sensors, or more than two distance sensors, as desired by a person skilled in the art. The multiple distance sensors 112, 114, 116 and 118 may have identical properties, for example sampling frequency, light wavelength and accuracy, or may be different in one aspect. At least one of the multiple distance sensors 112, 114, 116 and 118 may be removable or replaceable as needed.

The multiple distance sensors 112, 114, 116 and 118 may point to a predefined affixed direction, for example the direction being parallel to an imaginary line between a center 115 of the mobile robot 120 to the distance sensor. For example, distance sensor 112 points at direction d2 which continues imaginary line D2 between the center 115 to the distance sensor 112. For example, distance sensor 112 may sample point 122 located at wall 104, distance sensor 114 may sample point 124 located at wall 106, distance sensor 116 may sample point 126 located at wall 108 and distance sensor 118 may sample point 128 located at wall 102. The signal emitted by the multiple distance sensors 112, 114, 116 and 118 may be parallel to the ground, or may be tilted, as desired by a person skilled in the art.

The mobile robot 120 maneuvers the multiple distance sensors 112, 114, 116 and 118 in a rotational and synchronous movement in order to map substantially the entire circumference of the mobile robot 120. an example for such rotational and synchronous movement may be placing all the multiple distance sensors 112, 114, 116 and 118 on a maneuverable object, for example a plate or a sensor housing and rotating the maneuverable object in a rotational movement around in order to enable the multiple distance sensors 112, 114, 116 and 118 to sample substantially the entire circumference of the mobile robot. Thus, for example when the mobile robot 120 comprises three distance sensors, each pointing outwards, about 120 degrees from the other sensors, the rotational movement may be limited to 120 degrees at a certain point in which the mobile robot 120 is located inside the area 100. Similarly, in case the mobile robot 120 comprises 4 distance sensors distanced equally from one another, the rotational movement may be limited to 90 degrees. The rotational movement of the distance sensors may be enabled using a power source of the mobile robot, for example a battery or a renewable energy mechanism. The velocity of the rotational movement may be in the range of 0.01 r/s (radians per second) to 10 r/s. The velocity may be adjusted according to properties of a mapping mission performed by the mobile robot 120. For example, in case the mobile robot 120 maps the area 100, the velocity of the rotational movement may be at least 10 r/s and when the light in the area 100 as sensed by an illumination sensor located in the area 100 is lower than a predefined threshold, the rotational movement may be at most 1.5 r/s. Rules of adjusting the velocity of the distance sensors' rotational movement according to mapping properties or environmental properties may be stored in a memory module of the mobile robot 120 or in a remote device communicating with the mobile robot 120.

The multiple distance sensors 112, 114, 116 and 118 have a maximal sampling frequency, for example in the range of 50-1200 Hz. Thus, when the mobile robot 120 maps the area 100, the rotational movement of the multiple distance sensors 112, 114, 116 and 118 results in different points in the walls captured each time. For example, when rotating the multiple distance sensors 112, 114, 116 and 118 clockwise, the distance sensor 112 can sample point 122 and in the next sampling, the distance sensor will sample point 123. The physical distance between points 122 and 123 depends on the time elapsing between two samples from the distance sensor 112, the velocity of the distance sensor rotational movement and the distance to the wall 104. The time elapsing between two samples from the distance sensor 112, the velocity of the distance sensor rotational movement dictate the angle between emissions and the distance to the wall dictates the distance between subsequent emissions.

The multiple distance sensors 112, 114, 116 and 118 may be Point Time of light sensors, laser distance sensor, ultrasonic sensors, and other point sensors. In some other cases, the distance sensors may be depth cameras, stereo cameras, structure light cameras, coded light cameras, ToF cameras, or a camera array. Other types of distance sensors may be selected by a person skilled in the art.

In some cases, the mapping process requires a specific resolution, for example mapping the wall as the maximal distance between points in the wall is 1.2 centimeters. As the maximal emission frequency is limited, the mapping resolution depends on the distance to the wall and the velocity of the rotational movement. Thus, when the distance to the wall exceeds a predefined threshold, the mobile robot 120 may reduce the velocity of the rotational movement. Similarly, when the distance to the wall is lower than a predefined threshold, the mobile robot 120 may increase the velocity of the rotational movement. Adjusting the velocity of the rotational movement comprises reducing or increasing the velocity. In some cases adjusting the velocity of the rotational movement comprises changing a direction of the rotational movement, for example from clockwise to counter clockwise or vice versa.

A measured point must have a size in mapping. The minimal size is defined by the scan configuration. We can assume that a point in the map is a 0.05×0.05 m (5 cm2).

As a simplified example, the sensor sampling rate is 1 Hz, the rotational velocity of 0.52 r/s (30 deg per sec). In order to continuously scan a wall distanced 1 m from the distance sensor the rotational velocity of the distance sensor should be 0.0499 rad/sec. The case in which all the points are distanced equally from the distance sensor dictates that the wall is curved. In the common case where the wall is straight, the calculation of the rotational velocity may be performed frequently, for example once every frame, according to the following formula:

$$\omega = \arctan(R/d)$$

where

ω—angular velocity (rad/sec)
R—map resolution (m)
d—measured distance by the sensor (m)

The calculation must be performed for each sensor and, probably, the lowest velocity will be chosen in order to maintain the constraint of continuous scan.

Figure 2:
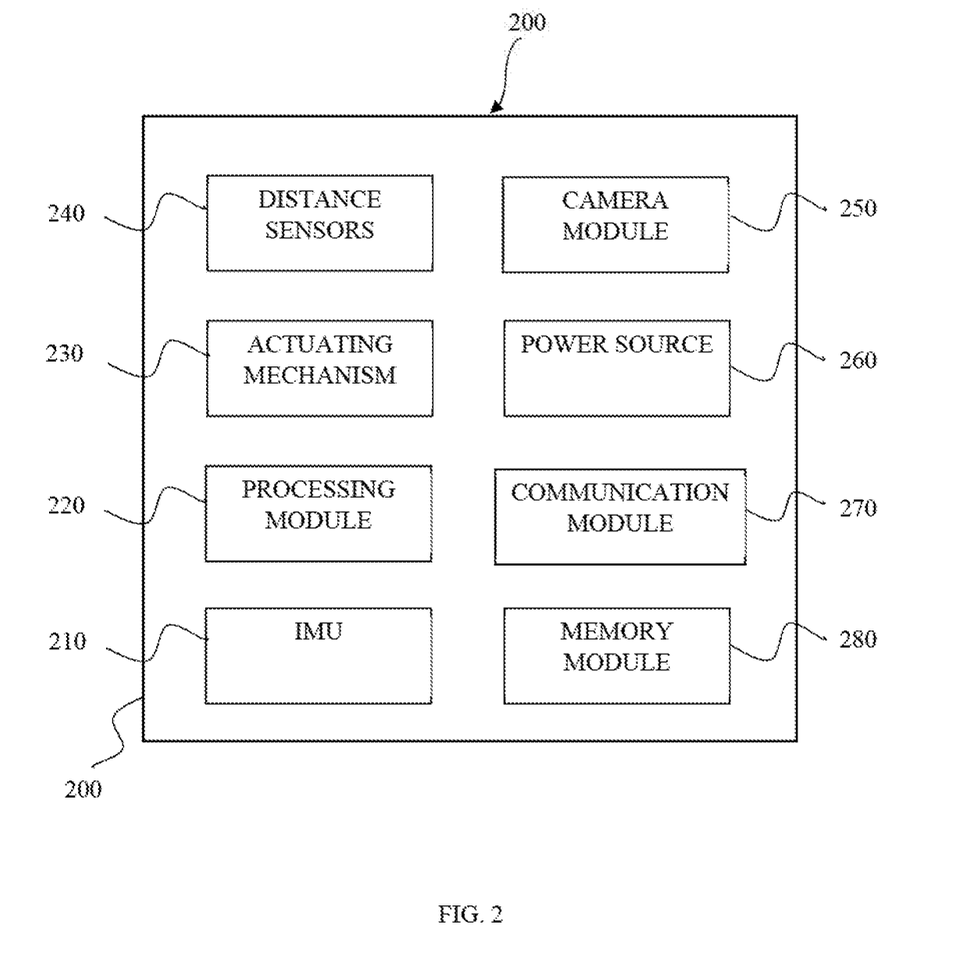
FIG. 2 shows schematic components of a mobile robot, according to exemplary embodiments of the disclosed subject matter.

FIG. 2 shows schematic components of a mobile robot, according to exemplary embodiments of the disclosed subject matter. The mobile robot 200 comprises multiple distance sensors 240 as disclosed above. The distance sensors 240 may be cameras. The distance sensors 240 may comprise a signal emitting module and a sensor for sensing the signal reflected back and measuring the time between emitting the signal and detecting the reflected signal. The mobile robot comprises multiple distance sensors, maneuvered using an actuation mechanism 230 of the robot 200. The actuation mechanism 230 may be a motor, an actuator and any mechanism configured to maneuver a physical member. The actuation mechanism 230 is coupled to a power source, such as a battery or a renewable energy member, such as a solar panel in case the area comprises or is adjacent to an outdoor area accessible to the mobile robot 200.

The mobile robot 200 may also comprise an inertial measurement unit (IMU) 210 configured to measure the robot's specific force and angular rate. The measurements collected by the IMU 210 and by the multiple distance sensors 240 may be transmitted to a processing module 220 configured to process the measurements. The processing module 220 is configured to control the rotational movement of the multiple distance sensors 240. Thus, the processing module 220 is electrically coupled to the actuation mechanism 230 configured to generate the rotational movement of the multiple distance sensors 240. The processing module 220 may adjust the velocity of the rotational movement according to at least some of the following: (1) measurements collected by the IMU 210, (2) measurements collected by sensors located in the mobile robot 200, (3) measurements collected by sensors located in the area and sending the measurements to the mobile robot 200 via communication module 270 (4) distance measurements collected by the multiple distance sensors 240, (5) images captured by a camera module 250 located in the mobile robot 200.

The processing module 220 may utilize a predefined set of rules stored in a memory module 280. For example, in case the distances measured by all the distance sensors are higher than 2 meters, reduce velocity by 35 percent. In another example, in case the distance measured by one of the sensors is shorter than 55 centimeters, increase the velocity to 2 m/s. In another example, in case the temperature in the area is higher than 30 degrees Celsius, increase the velocity of the rotational movement to the maximal velocity possible.

In some exemplary cases, the communication module 270 sends at least some of the collected measurements to a remote device which outputs the adjustment of rotational movement velocity. Such remote device may be a docking station of the mobile robot 200 or a server, such as a web server. The output of the remote device is converted by the processing module 220 into a command sent to the actuation mechanism 230 to adjust the rotational movement velocity.

Figure 3:
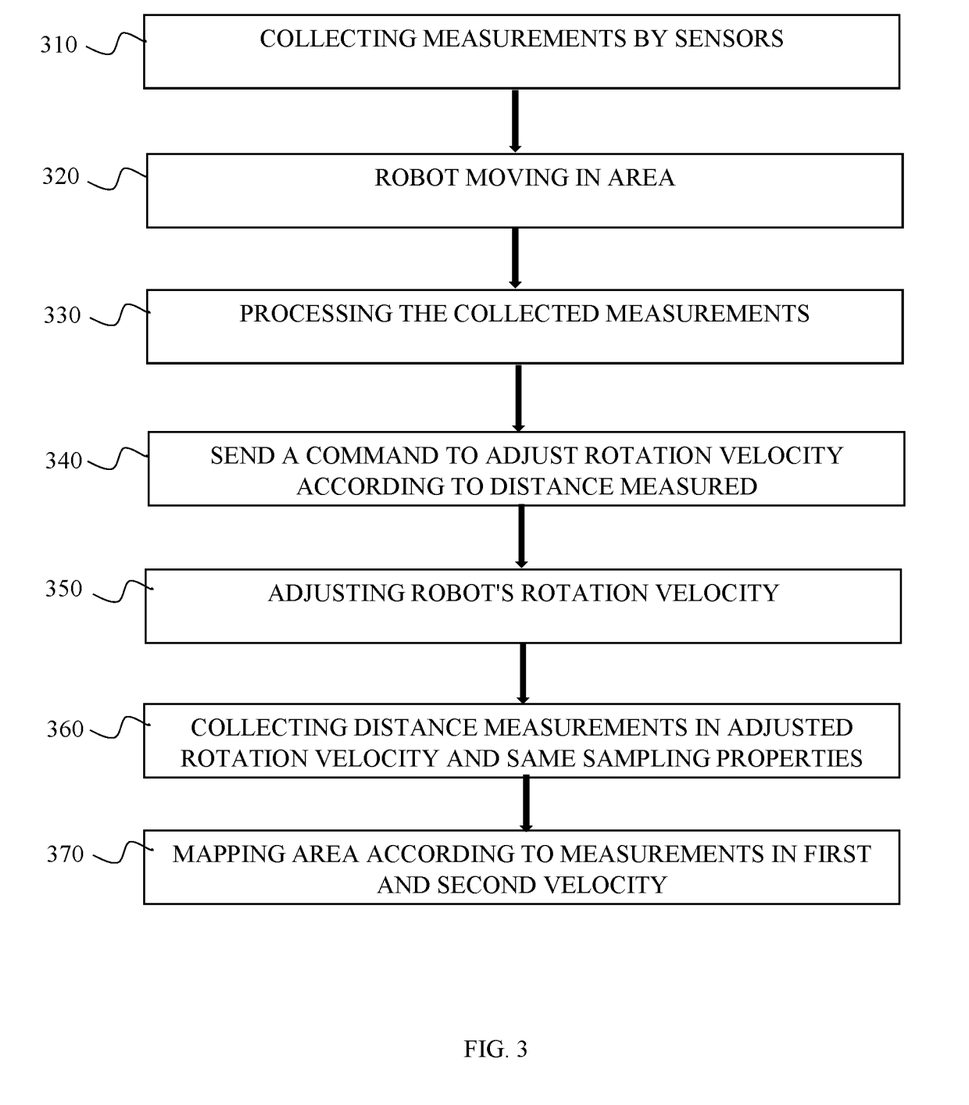
FIG. 3 shows a method of adjusting a rotational movement velocity of components in a mobile robot, according to exemplary embodiments of the disclosed subject matter.

FIG. 3 shows a method of adjusting a rotational movement velocity of components in a mobile robot, according to exemplary embodiments of the disclosed subject matter. Step 310 discloses collecting measurements by sensors of the mobile robot. Such sensors may be distance sensors, image capturing device, temperature sensors, light sensors, humidity sensors, noise sensors and the like. In case the mobile robot comprises multiple sensors of the same functionality, for example multiple distance sensors, each sensor of the multiple distance sensors sends the measurements along with an identifier of the sensor. The measurements may be collected in predefined rule, for example sampling the temperature once every 15 minutes, or collected in response to an event, for example activating a noise sensor in response to identifying an object by the image capturing device.

Step 320 discloses the mobile robot moving in the area. In some cases, the measurements collected in step 310 continue to be collected while the mobile robot moves in the area. The distance measurements are collected by rotating the distance sensors around an axis in the robot's body, while the robot moves in the area, for example on a surface of the area or in the air.

Step 330 discloses processing the collected measurements. Such processing may comprise comparing the collected measurements to a set of rules. The output of the processing may include a value used to adjust the velocity of rotational movement of the distance sensors, as elaborated above. The value may be a velocity value, for example 2 m/s, or a percentage for increasing or decreasing the velocity of rotational movement of the distance sensors. In step 340 the processing module of the mobile robot determines sends a command to the actuation mechanism to adjust the velocity of rotational movement of the distance sensors. The command may be sent via an electrical cable connecting the processing module and the actuation mechanism, or via any other electrical, magnetic or mechanical manner.

In step 350, the actuation mechanism adjusts the velocity of rotational movement of the distance sensors. Such adjustment may be implemented by adding or reducing power supplied to the actuation mechanism. In step 360, the distance sensors collect measurements in the adjusted velocity of rotational movement. For example, the first velocity of rotational movement was 0.5 r/s and the adjusted velocity of rotational movement is 0.7 r/s. Step 370 discloses mapping the area according to measurements collected by the distance sensors in the first velocity of rotational movement and the adjusted velocity of rotational movement. The distance measurements may be time-stamped, and the memory module stores the velocity of rotational movement at each time, in order to associate distance measurements to the velocity of rotational movement of the distance sensor while the measurement was collected.

Figure 4:
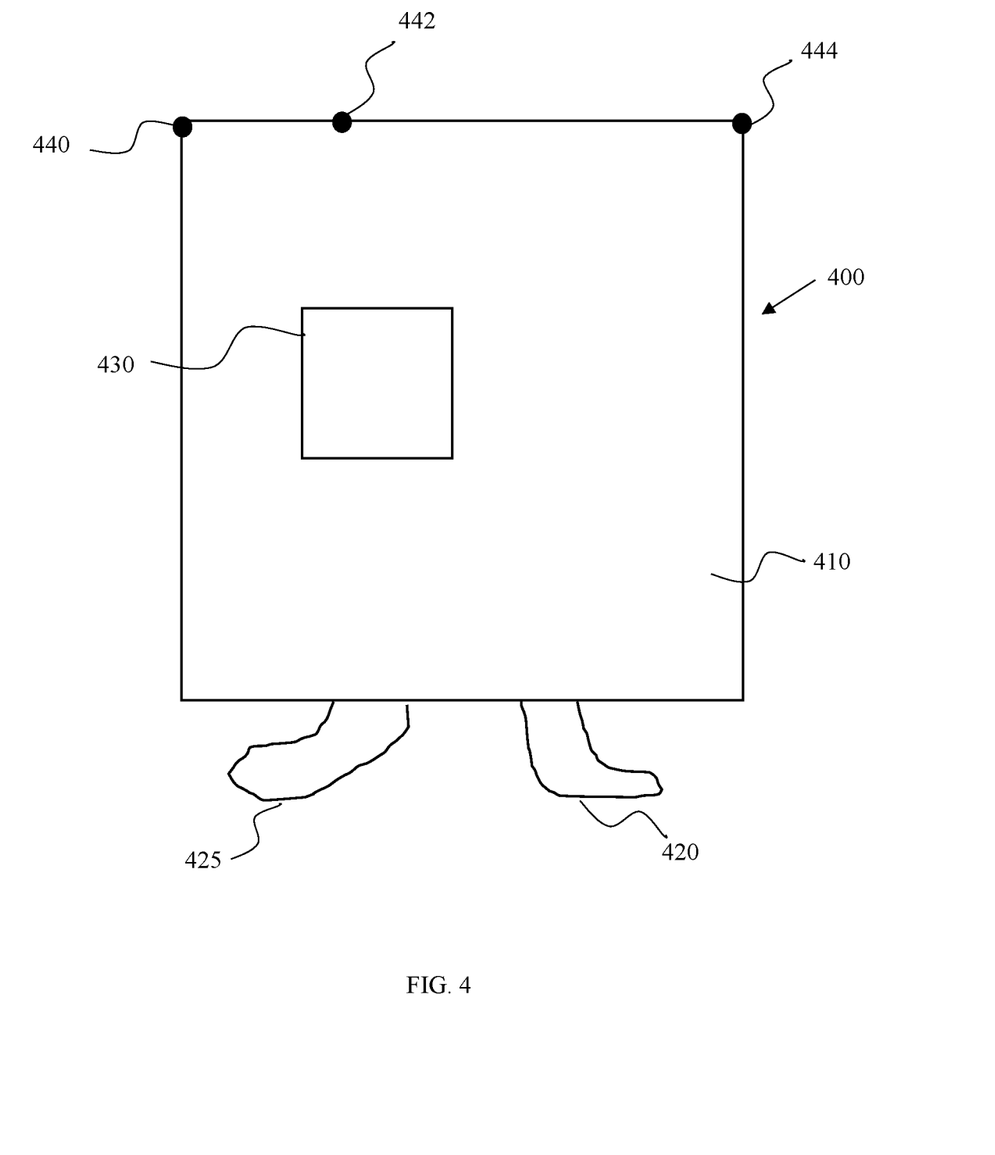
FIG. 4 shows a schematic lateral view of a mobile robot, according to exemplary embodiments of the subject matter; and, FIG. 5 shows a schematic top view of a mobile robot, according to exemplary embodiments of the subject matter.

FIG. 4 shows a schematic lateral view of a mobile robot, according to exemplary embodiments of the subject matter.

The mobile robot 400 comprises actuation mechanism 420, 425 configured to enable movement of the mobile robot 400 in the area. Such actuation mechanism 420, 425 may be arms movable on a surface of the area. The mobile robot 400 further comprises a body 410 connected to the actuation mechanism 420, 425 using a connecting mechanism (not shown) such as nuts and bolts, adhesives, welding and the like. The body 410 of the mobile robot 400 comprises electrical circuitry 430, which includes a processing module, memory module and a wireless communication module, as elaborated above.

The mobile robot 400 also comprises multiple distance sensors 440, 442, 444 located on a top section of the body 410. In some exemplary cases, the entire body moves rotationally relative to the ground when mapping the area using the multiple distance sensors 440, 442, 444. In some other cases, only a portion of the body, or a sensor housing holding the multiple distance sensors 440, 442, 444, moves rotationally when mapping the area. The multiple distance sensors 440, 442, 444 may be located at an external circumference of the body 410, directed outwards, emitting light towards objects in the area. The multiple distance sensors 440, 442, 444 are electrically coupled to the electrical circuitry 430, as the electrical circuitry performs at least a portion of processing, sending and storing the distance measurements.

Figure 5:
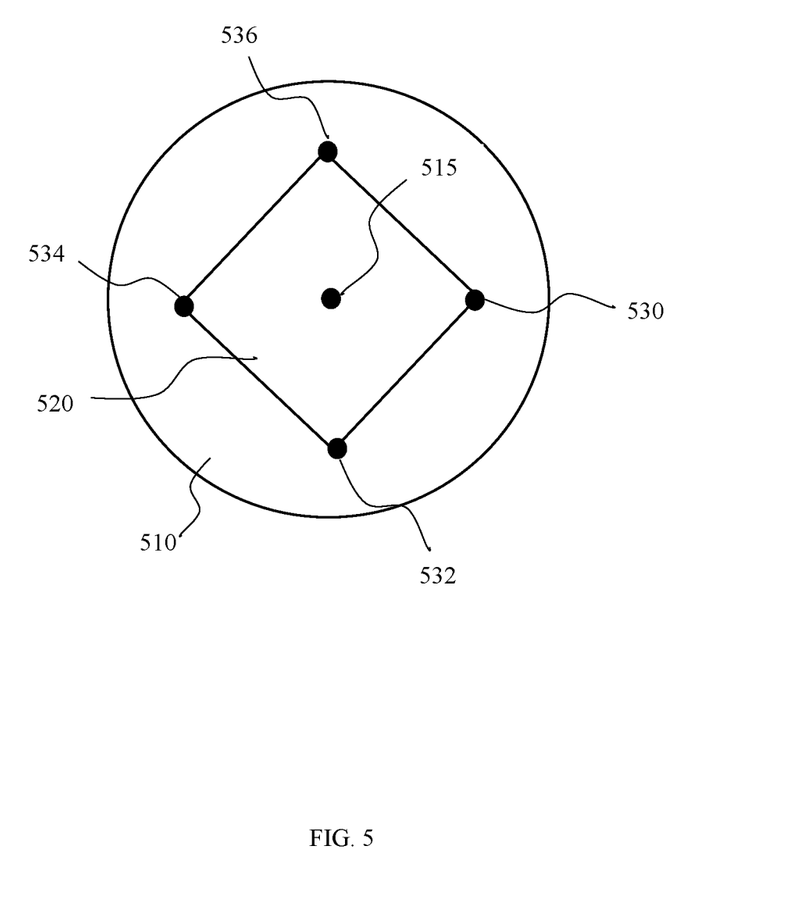

FIG. 5 shows a schematic top view of a mobile robot, according to exemplary embodiments of the subject matter. The top view shows a body 510 of the mobile robot and a sensor housing 520 located on top of the body 510. The sensor housing moves rotationally relative to the ground by rotating on an axis 515, said axis 515 is connected to both the body 510 and the sensor housing 520. The sensor housing 520 may rotate clockwise or counter clockwise relative to the body 510.

The sensor housing 520 is configured to hold distance sensors 530, 532, 534 and 536, configured to measure the distances between the body 510 to objects in the area. The distance sensors 530, 532, 534 and 536 may be positioned in niches in the sensor housing, each niche has an aperture via which the light is emitted from the distance sensor and hits the object in the area.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A mobile robot configured to map an area, comprising:
a body;
two or more distance sensors, configured to collect distance measurements between the mobile robot and objects in the area;
an actuator mechanically coupled to the body and to the two or more distance sensors, said actuator is configured to enable rotational movement of the two or more distance sensors;
a controller electrically coupled to the two or more distance sensors and to the actuator, said controller is configured to process the distance measurements collected by the two or more distance sensors and to instruct the actuator to adjust a velocity of the rotational movement according to the distance measurements collected by the two or more distance sensors.

2. The mobile robot according to claim 1, wherein the two or more distance sensors are four distance sensors arranged such that each sensor points at substantially 90 degrees from the other sensors.

3. The mobile robot according to claim 1, wherein the two or more distance sensors are configured to emit light towards objects in the area and measure a duration of time that the light travels to the object and back.

4. The mobile robot according to claim 1, further comprises an inertial measurement unit (IMU) configured to measure the body's specific force and angular rate.

5. The mobile robot according to claim 1, further comprises a camera configured to capture images of the area, wherein the controller is electrically coupled to the camera, said controller receives the captured images from the camera to estimate distance covered by the mobile robot while mapping the area, to assign a location to the distance measurements collected by the two or more distance sensors.

6. The mobile robot according to claim 1, further comprises a memory configured to store one or more rules concerning adjusting the velocity of the rotational movement, wherein the controller is electrically coupled to the memory for adjusting the velocity according to the one or more rules.

7. The mobile robot according to claim 6, wherein the one or more rules comprise reducing the velocity when the collected measurements show distance higher than a predefined threshold.

8. The mobile robot according to claim 1, further comprises a sensor housing configured to house the two or more distance sensors, wherein the sensor housing is secured to the body in a manner than enables rotating the sensor housing and the two or more distance sensors.

9. The mobile robot according to claim 1, wherein the two or more distance sensors are evenly distributed.

10. The mobile robot according to claim 9, wherein the rotational movement is limited to a predefined angle defined by the number of the two or more distance sensors.

11. The mobile robot according to claim 1, wherein the actuator is configured to move the two or more distance sensors in a rotational movement relative to the body of the mobile robot.

12. The mobile robot according to claim 1, wherein the actuator is configured to move the two or more distance sensors in a rotational movement applied synchronously to the body of the mobile robot.

13. The mobile robot according to claim 1, wherein adjusting the velocity of the rotational movement comprises changing a direction of the rotational movement.

14. The mobile robot according to claim 1, wherein the distance measurements are collected in a first velocity prior to adjusting the velocity of the rotational movement and collected in a second velocity after adjusting the velocity of the rotational movement.

15. A method for mapping an area by a mobile robot comprising distance sensors moving with rotational movement, said method comprising:
collecting distance measurements by the distance sensors of the mobile robot;
processing the collected distance measurements, wherein an output of said processing includes a value used to adjust a velocity of the rotational movement of the distance sensors;
adjusting the velocity of rotational movement of the distance sensors with said value; and collecting measurements with the distance sensors at the adjusted velocity of the rotational movement.

* * * * *